United States Patent [19]
McCombs, Jr.

[11] 3,713,366
[45] Jan. 30, 1973

[54] FORCE BALANCE LEVER MECHANISM

[75] Inventor: Howard Lewis McCombs, Jr., South Bend, Ind.

[73] Assignee: The Bendix Corporation

[22] Filed: March 24, 1971

[21] Appl. No.: 127,700

[52] U.S. Cl. .................. 91/47, 91/382, 74/522
[51] Int. Cl. .................................. F15b 9/10
[58] Field of Search .............. 91/47, 382; 74/522

[56] References Cited

UNITED STATES PATENTS

| 2,764,868 | 10/1956 | Watson et al. | 91/47 |
| 2,980,069 | 4/1961 | Hilker et al. | 91/382 |
| 3,045,983 | 7/1962 | Best | 91/382 |
| 3,215,346 | 11/1965 | Alberoni | 91/47 |
| 3,393,606 | 7/1968 | Magnani | 91/47 |

*Primary Examiner*—Paul E. Maslousky
*Attorney*—Gordon H. Chenez and Plante, Hartz, Smith and Thompson

[57] ABSTRACT

A force balance lever system for controlling a positionable output member as a square or square root function of a variable input force.

16 Claims, 5 Drawing Figures

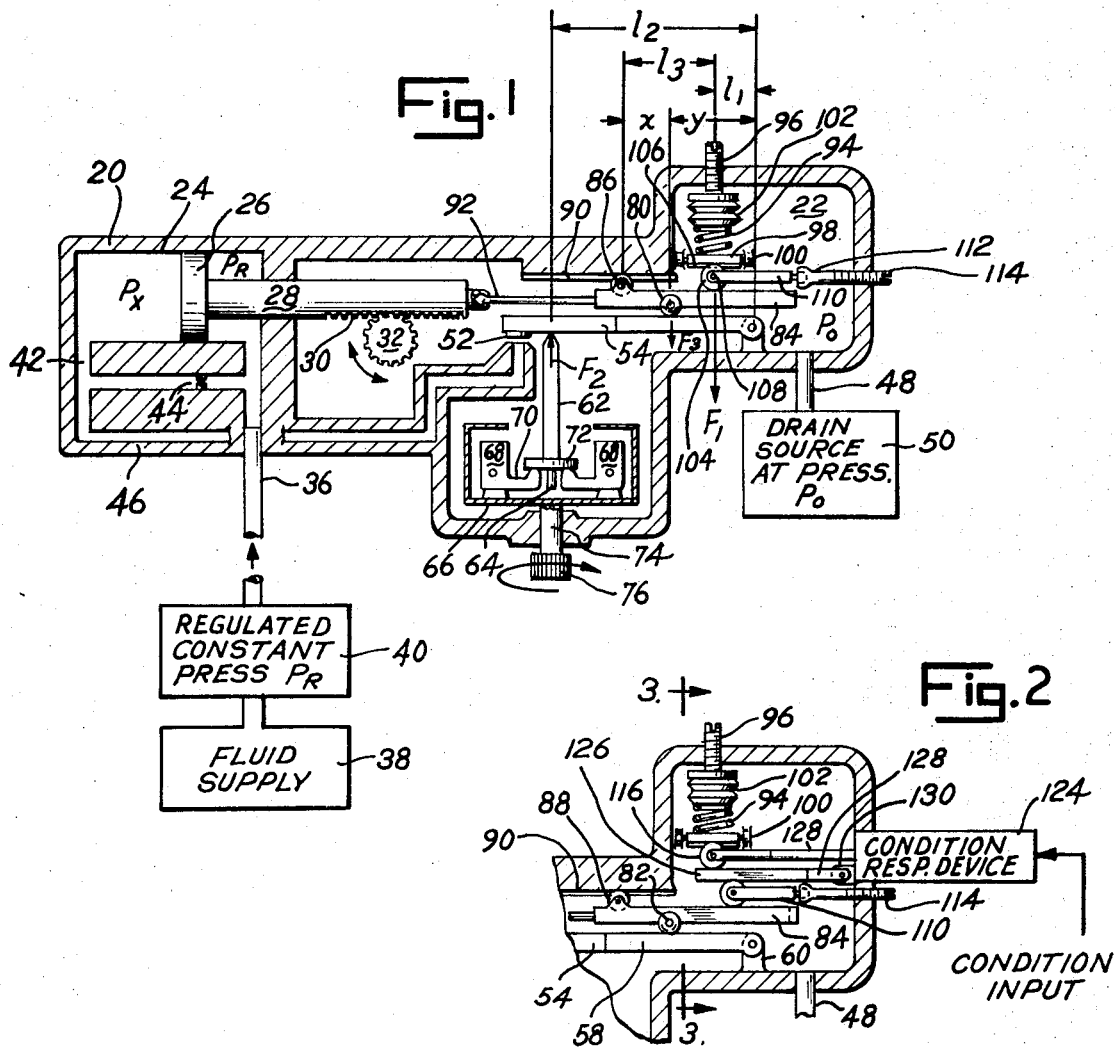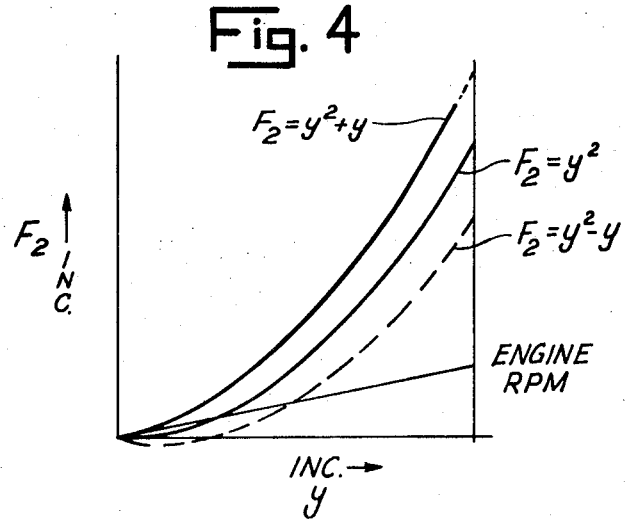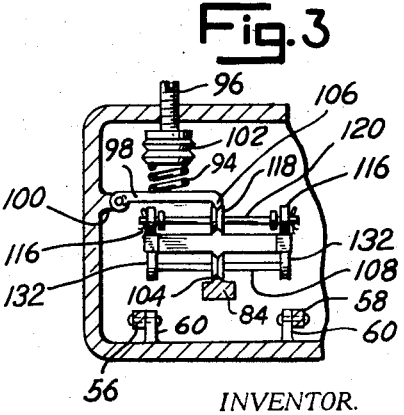

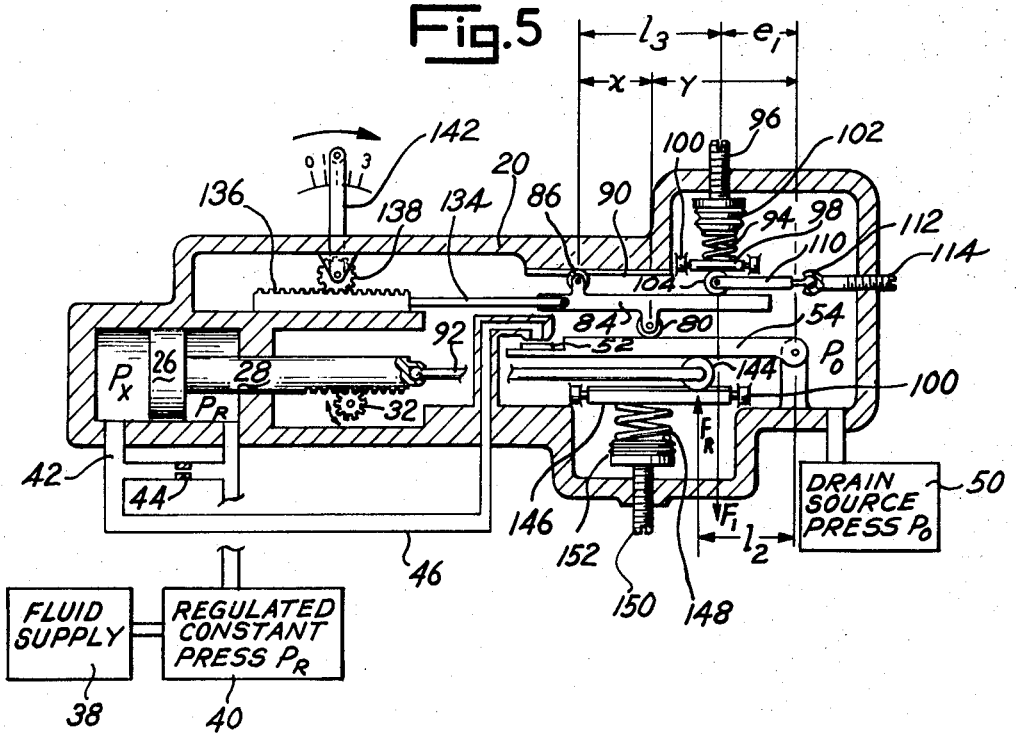

3,713,366

FORCE BALANCE LEVER MECHANISM

BACKGROUND OF THE INVENTION

Numerous prior art control devices require reliable and accurate control over an output control signal as a predetermined function of a variable control input signal as, for example, in combustion engine governor devices wherein it may be desired to establish the position of a fuel control member as a predetermined function of engine speed. In such a case, engine driven centrifugal weights normally generate a control input force which varies as a function of engine speed squared as will be recognized by those persons skilled in the art. As a result of the squared function of input force relative to engine speed, an attempt to control the position of an output member as a linear function of engine speed necessitates the use of cams, multiple lever networks, or the like, to compensate for the squared relationship of input force to engine speed which, in turn, causes a corresponding increase in control complexity and associated problems in control reliability, size, weight, accuracy as well as manufacturing cost.

In other control applications, it may be desirable to position the control output member as a non-linear function as, for example, the square, of a control input signal representing a condition of operation other than engine speed in which case the control network complexity suffers accordingly.

SUMMARY OF THE INVENTION

The present invention has for an object to provide a simple and reliable force balance system wherein the output position of a movable control member is reliably and accurately controlled as a predetermined function of the square or square root of a control input signal.

It is an object of the present invention to provide a force balance system for an engine governor and particularly adapted for use in controlling a positionable member as a predetermined function of the square root of a control input force derived from engine rotational speed.

Other objects and advantages of the present invention will be apparent to those skilled in the art from the following description taken with the accompanying drawings.

BRIEF DESCRIPTION OF THE DRAWINGS

FIG. 1 represents a schematic drawing of an engine speed sensing device embodying the force balance system of the present invention;

FIG. 2 represents a schematic drawing of a portion of FIG. 1 showing a modified form of the force balance system;

FIG. 3 represents a cross sectional view taken on line 3—3 of FIG. 2;

FIG. 4 represents a series of curves having an input force $F_2$ vs. output position y relationship.

FIG. 5 represents a modified form of FIG. 1 wherein an output position signal varies as the square of an input position signal.

DESCRIPTION OF THE PREFERRED EMBODIMENTS

Referring to the drawings and FIG. 1 in particular, numeral 20 designates a casing or housing defining a chamber 22 and a cylinder 24. A differential area piston 26 slidably carried in cylinder 24 is provided with a shaft 28 extending axially therefrom into chamber 22 and slidably carried by housing 20. A rack portion 30 formed in shaft 28 is adapted to mesh with a spur gear 32 suitably mounted on a rotatable support shaft 34 the rotational position of shaft 34 providing an output control signal for use in actuating a fuel control member or the like, not shown.

The differential area piston 26 has a smaller effective area exposed to fluid at a substantially constant pressure $P_R$ vented thereto via a passage 36 leading from a pressurized fluid supply source 38. A conventional fluid pressure regulator 40 suitably connected to passage 36 downstream from source 38 operates in a well known manner to regulate pressure $P_R$. The opposite larger effective area of piston 26 is vented to passage 36 via a passage 42 containing a restriction 44. A discharge passage 46 communicates passage 42 downstream from restriction 44 to chamber 22 which chamber is vented via a passage 48 to a fluid drain source 50 at relatively low drain fluid pressure $P_0$. A flapper valve 52 connected to and actuated by a lever 54 is adapted to coact with the discharge end of passage 46 to vary the effective flow area thereof and thus the fluid pressure $P_X$ imposed on the piston 26 which, in turn, determines movement of the same.

The lever 54 is provided with a yoke portion having arms 56 and 58 each of which arms are suitably pinned for pivotal movement on a fixed support 60. A variable input force $F_2$ imposed on lever 54 by a stem 62 loads lever 54 in a clockwise direction as viewed in FIG. 1. The stem 62 is slidably carried for axial movement on a pin 64 integral with a rotatable table 66. A pair of centrifugal weights 68 pivotally mounted on table 66 are rotatable therewith and are provided with arms 70 which engage a collar 72 integral with stem 62. The rotatable table is provided with a stub shaft 74 suitably mounted for rotation in housing 20 and having a gear 76 fixedly secured thereto. The gear 76 is suitably connected to and driven by conventional driving linkage, not shown, attached to and rotated by a combustion engine, not shown, the rotational speed of which is to be measured. The centrifugal weights 68 generate a force which is a square function of the rotational speed of table 66 and thus speed of the engine driving the same. The centrifugal weights 68 bear against collar 72 thereby urging stem 62 against lever 54 loading the same with force $F_2$.

A force $F_3$ is imposed on lever 54 in opposition to force $F_2$ by a pair of rollers 80, each of which ride against associated arms 56 and 58 of lever 54. The rollers 80 are mounted for rotation on a pin or shaft 82 carried by a lever 84. A roller 86 having a peripheral groove 88 is suitably pinned for rotation on lever 84 in axially spaced apart relationship to rollers 80. The groove 88 mates with a fixed track 90 along which roller 86 is guided. The lever 84 is attached to shaft 28 via a link 92 thereby assuming a position longitudinally in accordance with the position of piston 26.

The force $F_3$ is derived from a constant reference force $F_1$ generated by a compression spring 94 interposed between an adjustable spring retainer 96 threadedly secured to housing 20 and a plate 98. The plate 98 is suitably pinned for pivotal movement on a fixed support 100. A plurality of conventional temperature responsive discs or capsules 102 may be interposed between spring 94 and retainer 96 to compensate for variations in the rate of spring 94 caused by changes in temperature of the fluid surrounding spring 94 to thereby maintain the output force of spring 94 at a constant predetermined value regardless of temperature variations.

The reference force $F_1$ is transmitted to lever 84 via a roller 104 which is suitably mounted for rotation on a pin or shaft 108 which shaft 108 is secured to a yoke member 110. The roller 104 is grooved to mate with a track 106 integral with plate 98. The yoke member 110 is secured via a suitable ball and socket connection 112 to an adjustable stem 114 threadedly secured to housing 20 thereby providing adjustment of roller 104 for control calibration purposes.

Referring to FIG. 2, the embodiment disclosed therein includes the addition of an adjustable roller positioned as a function of a variable condition of operation such as an engine operating temperature for varying the effective reference force $F_1$ imposed on lever 84. To that end, a pair of rollers 116 and a roller 118 interposed therebetween are rotatably mounted on a pin or shaft 120 in spaced apart relationship. The shaft 120 is secured to a yoke member 122 suitably secured to and actuated by a conventional condition responsive device generally indicated by 124 adapted to respond to a suitable input signal such as a engine operating temperature and position yoke member 122 as a function of the input signal. The roller 118 is suitably grooved to mate with track 106 on plate 98 and rollers 116 are adapted to ride against corresponding arms of a yoke portion 126 of a lever 128 suitably pinned for pivotal movement on a fixed support 130. The yoke 110 carrying roller 104 which is adapted to transmit force from yoke portion 126 to lever 84 is modified to accommodate a pair of rollers 132 mounted on shaft 108 in spaced-apart relationship. The rollers 132 ride against corresponding arms of the yoke portion 126.

It will be assumed that the mechanism of FIG. 1 is in operation with the flyweights 68 rotating at a given speed thereby generating a corresponding force $F_2$ against lever 54. Referring to FIG. 1, the various effective lever arms through which the forces $F_1$ and $F_3$ act are identified as $l_1$, $l_2$ and $l_3$, the fixed axial spacing of rollers 80 and 86 identified as $x$ and the output position or travel of piston 26 identified as $y$. For a balanced condition of the force lever network of FIG. 1, the following relationships exist.

$$F_2 l_2 = F_3 y \text{ therefore } F_3 = l_2/y \text{ and } F_2 = (y/l_2) F_3 \quad (1)$$

$$F_1 l_3 = F_3 x \text{ therefore } F_3 = F_1 (l_3/x) \quad (2)$$

$$l_3 + l_1 = x + y \text{ therefore } l_3 = x + 6 - l_1 \quad (3)$$

$$\text{By substitution } F_3 = F_1 (x + y - l_1)/x \quad (4)$$

Substituting (4) into (1)

$$F_2 = F_1 (y/l_2)(x + y - l_1/x) \text{ therefore}$$

$$F_2 = (F_1/l_2 x) y^2 + F_1 (1/l_2 - 1/x l_2) y \quad (5)$$

$$y = F_2 / [(F_1/x l_2) y + F_1 (1/l_2 - l_1/x l_2)]$$

$$y = F_2 / [(F_1/x l_2)(l_3 - x + l_1) = F_1 (1/l_2 - l_1/x l_2)] \quad (6)$$

Let $a = l_1/x$ and substitute in (5) to give $$F_2 = (F_1/x l_2) y^2 + (F_1/l_2)(1 - a) y \quad (7)$$

Let $a = 1$ and equation 7 becomes $$F_2 = (F_1/x l_2) y^2 \quad (8)$$

Let $a = \frac{1}{2}$ and equation 7 becomes $$F_2 = (F_1/x l_{x l2}) y^2 + (F_1/l_2)(\frac{1}{2}) y \quad (9)$$

Let $a = 2$ and equation 7 becomes $$F_2 = (F_1/x l_2) y^2 + (F_1/l_2)(-1) y \quad (10)$$

Making $F_1$, $x$ and $l_2$ equal to unity and deleting constants, equations 8, 9 and 10 may be respectively reduced to $$F_2 = y^2 \quad (11)$$

$$F_2 = y^2 + y \quad (12)$$

$$F_2 = y^2 - y \quad (13)$$

Referring to FIG. 3, the equations 11, 12 and 13 are plotted to show the curved relationship. A fourth curve is plotted showing the linear relationship between $y$ and engine rpm derived from the relationship $F_2 = y^2$ wherein $F_2$ varies as the square of engine rpm.

Referring to FIG. 2 wherein the constant reference force $F_1$ is modified as a function of atmospheric air temperature $\theta$ by the position of roller 116, the equation (8) may be rewritten $$y = \sqrt{(F_2 x l_2)/F_1} \quad (14)$$

Substituting $F_2 = K_N N^2$ and $F_1 = KT = K_T \theta$ wherein $N$ represents engine rotational speed, $K_N$ a constant, $T$ is atmospheric temperature in degrees Fahrenheit and $K_T$ is $K/519$ to correct to absolute temperature, equation 14 may be rewritten $$y = (N \sqrt{\theta}) \sqrt{(K_N l_2 x)/K_T} \quad (15)$$

It will be noted from equation (15) that the output position $y$ of piston 26 represents engine rotational speed corrected for atmospheric temperature as will be recognized by those persons skilled in the art.

Assuming the input force $F_2$ to increase as a result of an engine speed variation, the lever 54 is unbalanced causing flapper 52 to move in an opening direction which, in turn, causes a corresponding drop in pressure $P_x$ and movement of piston 26 toward the left as viewed in FIG. 1. The lever 84 follows piston 26 thereby causing roller 88 to move along track 90 and rollers 80 to move along lever 54 which, in turn, increase the effective lever arms $l_3$ and $y$ through which the forces $F_1$ and $F_3$, respectively, act.

The lever 84 being loaded by force $F_1$ tends to pivot about the point of contact of roller 86 and track 90 as a result of the increase in effective lever arm $l_3$ thereby producing a corresponding increase in force $F_3$ which, in combination with the increase in effective lever arm $y$, results in a force moment balance on lever 54 which, in turn, stabilizes flapper 52 thereby reestablishing the pressure $P_x$ required to stabilize piston 26. The gear 32 being rotated by rack 30 as a result of piston 26 movement establishes an output position signal as a linear function of engine rotational speed in accordance with the relationship set forth in equation (11). The roller 104 may be adjusted by securing the threaded stem 114 in or out as required to establish linearity accuracy.

In the event of a decrease in engine speed and a corresponding reduction in force $F_2$, the above related sequence will be reversed causing movement of piston 26 toward the right as viewed in FIG. 1. However, regardless of the relative change in engine speed, the resulting variation in force $F_2$ will cause the piston 26 to assume a position y relative to the pivot axis of lever 54 which position is a linear function of engine speed.

Referring to FIG. 2, the effective lever arm of lever 126 through which the constant force of spring 94 acts is varied by roller 116 in response to variations in temperature imposed on condition responsive device 124 such that the constant reference force $F_1$ against which the force $F_2$ is referenced is modified to provide the engine speed N corrected for temperature $\theta$ function set forth in equation (15).

It will be recognized that the condition responsive device 124 may be responsive to a variable condition of operation other than temperature as, for example, an engine operating pressure or the like.

It will be noted that the input force, $F_2$, vs. piston 26 position, y, may be varied as indicated by the curves corresponding to $F_2 = y^2 + y$ or $F_2 = y^2 - y$ for control purposes by suitable variation of the lever arm ratio $l_1/x$ in the manner disclosed in equations (9) and (10). Furthermore, it will be recognized that the input force $F_2$ may have a linear relationship with an engine operating condition from which it is derived in which case the output position of piston 26 will vary as a square root function of the engine operating condition as shown in FIG. 4.

The embodiment of FIg. 1 may be readily adapted for use as a fluid flow meter wherein the flow through a fluid restriction, not shown, of known area is measurable as a function of the square root of the pressure drop thereacross. To that end, the centrifugal weights 68 and associated stem 62 of FIG. 1 may be deleted and replaced by a bellows or the like responsive to the pressure drop across the restriction in which case the output force of the bellows defines force $F_2$. The resulting position of piston 26 is a function of the square root of the output force derived from the pressure drop across the restriction and thus flow therethrough.

Referring to FIG. 5, the embodiment shown therein is similar to FIG. 1 modified to establish an output position signal which is a function of the square of an input position signal. Structure common to FIGS. 1 and 5 is identified by the same numeral. The lever 84 is connected via a link 134 to and actuated by a rack member 136 slidably secured to casing 20 and driven by a spur gear 138 rotatably mounted on a fixed support 140. A movable control lever 142 suitably secured to spur gear 138 is adapted to rotate the same. The piston 26 is connected via shaft 28 and link 92 to roller means 144 interposed between lever 54 and a plate 146 which, like plate 98, is pinned for pivotal movement on an associated fixed support 100. A compression spring 148 interposed between plate 146 and an adjustable spring retainer 150 threadedly engaged with casing 20 imposes a predetermined constant reference force against plate 146. A plurality of temperature responsive discs or capsules 152 may be interposed between spring 148 and retainer 150 to compensate for the temperature effect of the fluid surrounding spring 148.

The relationship set forth in equations (1) through (14) hold true in the embodiment of FIG. 5 except that, unlike FIG. 1 wherein force $F_2$ is variable, and acts through a fixed lever arm $l_2$, the force $F_R$ in FIG. 5 is constant and the effective lever arm $l_2$ through which the force $F_R$ acts is variable. Assuming the lever arm ratio $l_1/x$ to be 1 and the lever 84 to be in a position where roller 80 is aligned with roller 104, and $l_3$ is equal to x, it will be noted that the force applied by roller 80 against lever 54 is equal to $F_1 x/x$ or $F_1$. The force moment on lever 54 is $F_1 y$ wherein y designates the input position of rack member 136 relative to the pivot axis of lever 54. For a balanced condition of lever 54, $F_1 y$ is opposed by an equal force moment defined by $F_R l_2$. Assuming the forces $F_1$ and $F_R$ to be equal, the position of piston 26 which establishes the position of roller means 144 relative to the pivot axis of lever 54 and thus lever arm $l_2$ is equal to $l_1$ and $l_2$ equals the square of $l_1$ or the square root of one equals one.

Now assuming the control lever 142 is advanced to the position shown in FIG. 5 where rack member 136 occupies a position corresponding to two units, the lever 84 moves accordingly causing a corresponding increase in lever arms $l_3$ and y to two units each. The force imposed by roller 80 on lever 54 is equal to $F_1 2x/x$ or $2F_1$ and the corresponding force moment is $2F_1 y$ which unbalances the lever 54 in a counter clockwise direction as viewed in FIG. 5 causing flapper valve 52 to move in an opening direction and a corresponding drop in pressure $P_x$. The piston 26 responds to the $P_R - P_X$ pressure differential causing roller means 144 to move away from the pivot axis of lever 54 and increase the length of lever arm $l_2$. Since y is equal to two units, $2F_1 y$ equals $4F_1$. The opposing force moment $F_R l_2$ must equal $4F_1$ to balance lever 54. Since $F_R$ and $F_1$ are equal, the lever arm $l_2$ must increase to four units to establish the required force moment balance on lever 54 which, in turn, causes stabilization of piston 26. Thus, the position of piston 26 is representative of the input of two units squared. The gear 32 actuated by piston 26 provides the required output position signal.

It will be recognized that the control lever 142 may be advanced or retarded to cause a corresponding increase or decrease in the input lever arm $l_3$ and a corresponding force moment unbalance on lever 54. In any event, the resulting displacement of piston 26 to reestablish a force moment balance on lever 54 is equal to the square of the input position signal established by control lever 142.

If desired, an output pressure signal instead of an output position signal may be obtained from the embodiment of FIG. 5. To that end, the piston 26, roller means 144 as well as plate 146, spring 148 and retainer 150 may be deleted and replaced by a pressure responsive member, not shown, connected to impose a force on lever 54 in opposition to the force imposed by roller 80. The pressure responsive member may be responsive to a fluid pressure suitably controlled by flapper valve 52 such that the output force derived from the pressure responsive member varies as required to maintain a force moment balance on lever 54. The controlled fluid pressure imposed on the pressure responsive member may be sensed to provide an output pressure or force signal which is a function of the square of the input position signal of control lever 142.

I claim:

1. A force moment balance lever system comprising:
   a first lever mounted on a fixed support for pivotal movement thereon;
   a second lever having spaced apart first and second portions engageable with a fixed support and said first lever, respectively;
   first force producing means operatively connected to said first lever for imposing a force thereon;
   second force producing means operatively connected to said second lever for imposing a reference force thereon in opposition to said first force producing means;
   positionable means operatively connected to said second lever for actuating the same relative to the pivot axis of said first lever to vary the effective lever arm of said first lever through which said reference force acts and the effective lever arm of said second lever through which said first force producing means acts.

2. A force moment balance lever system as claimed in claim 1 wherein:
   said second force producing means exerts a substantially constant reference force on said second lever.

3. A force moment balance lever system as claimed in claim 1 wherein:
   said first force producing means is a variable input force;
   said positionable means being operatively connected to said first lever and actuated in response to a force moment unbalance on said first lever caused by a change in said input force;
   said positionable means being operatively connected to said second lever for actuating the same to establish an equal force moment on said first lever in opposition to said variable input force;
   said positionable means providing an output signal as a function of the square root of said input force.

4. A force moment balance lever system as claimed in claim 1 wherein:
   an input signal is established by a movable control member operatively connected to said second lever for actuating the same to cause a force moment unbalance on said first lever;
   said first force producing means has a substantially constant output force and said operative connection with said first lever includes a movable force transmitting member positionable along said first lever;
   said positionable means being operatively connected to said first lever and actuated in response to said force moment unbalance thereon;
   said positionable means being operatively connected to said force transmitting member for actuating the same to vary the effective moment arm of said first lever through which said first force producing means acts to establish a force moment balance on said first lever;
   said positionable means providing an output position signal as a function of the square of said input signal.

5. A force moment balance lever system as claimed in claim 1 wherein:
   said first and second force producing means are spring means providing a substantially constant output force.

6. A force moment balance lever system for controlling an output control signal as a predetermined function of a variable input force signal comprising:
   a first pivotally mounted lever responsive to said variable input force;
   positionable means operatively connected to said first lever and actuated in response to a force moment unbalance thereon caused by a change in said input force;
   a second lever having spaced apart first and second portions engageable with a fixed support and said first lever, respectively;
   said second portion being adapted to impose a variable reference force against said first lever in opposition to said input force;
   force producing means for generating a predetermined constant reference force;
   force transmitting means operatively connected to said force producing means and said second lever for imposing said constant reference force on said second lever;
   said second lever being actuated by said positionable means to thereby displace said first and second portions along said fixed support and said first lever, respectively, thereby varying the effective moment arm of said second lever through which said constant reference force acts and the effective moment arm of said first lever through which said variable reference force acts in opposition to said input force to establish a force moment balance on said first lever in response to which said positionable means is stabilized.

7. A force moment balance lever system as claimed in claim 6 wherein:
   said input force acts against said first lever through a fixed effective moment arm relative to the pivot axis of said first lever.

8. A force moment balance lever system as claimed in claim 6 wherein:
   said force producing means is defined by a compression spring.

9. A force balance lever system as claimed in claim 6 wherein:
   said first and second levers are parallel;
   said second lever being actuated in a direction perpendicular to the pivot axis of said first lever.

10. A force moment balance lever system as claimed in claim 6 wherein:
    said positionable means includes a fluid pressure differential responsive piston responsive to variations in a controlled fluid pressure; and
    valve means operatively connected to said first lever and actuated thereby to vary said controlled fluid pressure and thus the position of said piston.

11. A force moment balance lever system as claimed in claim 6 wherein:
    said first and second portions are defined by first and second roller means rotatably secured to said second lever in fixed spaced apart axial relationship.

12. A force moment balance lever system as claimed in claim 11 wherein:

said fixed support is defined by a fixed track along which said first roller is adapted to roll thereby providing a pivot for said second lever.

13. A force moment balance lever system as claimed in claim 6 wherein:

said positionable means is positioned as a square root function of said variable input force.

14. A force moment balance lever system as claimed in claim 11 wherein:

said force transmitting means is defined by roller means rotatably secured to an adjustable support and positionable thereby along said second lever and perpendicular to the pivotal axis of said first roller to vary the effective lever arm through which said constant reference force acts for control calibration.

15. A force moment balance lever system as claimed in claim 6 wherein:

said force transmitting means includes a third lever pivotally secured to a fixed support;

first roller means interposed between said force producing means and said third lever for imposing said constant reference force on said third lever;

condition responsive means responsive to a variable condition of operation operatively connected to said roller means for actuating the same along said third lever to thereby vary the effective lever arm of said third lever through which said constant reference force acts;

second roller means interposed between said third lever and said second lever and operatively connected to an adjustable support adapted to position said second roller means along said second lever and perpendicular to the pivotal axis of said second lever to vary the effective lever arm of said second lever through which said reference force imposed by said second roller acts.

16. A force moment balance lever system as claimed in claim 8 and further comprising:

a fixed spring retainer;

a pivotally mounted spring retainer;

said compression spring being interposed between said fixed and pivotally mounted spring retainers; and temperature responsive means interposed between said fixed retainer and said compression spring and responsive to the temperature of fluid surrounding said compression spring and adapted to compensate for temperature variation effects on the spring rate of said compression spring.

* * * * *